United States Patent [19]

Rich

[11] Patent Number: 4,766,028
[45] Date of Patent: Aug. 23, 1988

[54] DAMPING DEVICE FOR DAMPING NOTABLY THE VIBRATIONS RELATIVE TO A STRUCTURAL ELEMENT

[75] Inventor: Gerard Rich, Soultz, France

[73] Assignee: Rollin, S. A., Steinback, France

[21] Appl. No.: 946,673

[22] Filed: Dec. 30, 1986

Related U.S. Application Data

[63] Continuation of Ser. No. 779,548, Sep. 24, 1985, abandoned.

[30] Foreign Application Priority Data

Sep. 28, 1984 [FR] France ................................ 84 14993

[51] Int. Cl.$^4$ .............................................. B32B 7/00
[52] U.S. Cl. ..................................... 428/253; 428/246; 428/247; 428/250; 428/256; 428/284; 428/285
[58] Field of Search ............... 428/105, 109, 113, 246, 428/247, 250, 251, 252, 253, 256, 284, 285, 902

[56] References Cited

U.S. PATENT DOCUMENTS

| | | | |
|---|---|---|---|
| 3,399,104 | 8/1968 | Ball et al. | 161/68 |
| 4,056,161 | 11/1977 | Allen, Jr. | 181/290 |
| 4,278,726 | 7/1981 | Wuene | 428/229 |
| 4,283,457 | 8/1981 | Kolsky et al. | 428/285 |

FOREIGN PATENT DOCUMENTS

| | | |
|---|---|---|
| 844382 | 7/1952 | Fed. Rep. of Germany . |
| 861510 | 1/1953 | Fed. Rep. of Germany . |
| 1196432 | 7/1965 | Fed. Rep. of Germany . |
| 3306245 | 8/1984 | Fed. Rep. of Germany . |
| 1467785 | 1/1967 | France . |
| 2437530 | 4/1980 | France . |
| WO8204454 | 6/1982 | PCT Int'l Appl. . |
| 640074 | 12/1983 | Switzerland . |
| 513171 | 3/1938 | United Kingdom . |
| 937172 | 9/1963 | United Kingdom . |
| 2113346 | 12/1981 | United Kingdom . |

OTHER PUBLICATIONS

Frequency and Loss Factors of Sandwich Beams Under Various Boundary Conditions, D. K. Rao, J. M. E. Science, 20 (5), p. 271, 1978.

Free Vibration of Thin Walled Open Section Beams with Constrained Damping Treatment, S. Narayanan, et al., J. of Sound and Vibration, 74 (3) 1981.

*Primary Examiner*—James J. Bell
*Attorney, Agent, or Firm*—John Dana Hubbard; William L. Baker

[57] ABSTRACT

The invention concerns a damping device having improved damping properties, including a lower damping viscoelastic layer made from a viscoelastic material affixed to a structural element, and an upper stress constraining layer located above the lower viscoelastic layer on the side opposite of the structural element. The upper stress constraining layer is a composite stress constraining layer having a stress constraining element embedded in a damping material. This stress constraining element can be a clothlike element selected from a knit, a woven or unwoven fabric, or can be prepared from a grid of bundles of strands linked together through welding or gluing.

20 Claims, 1 Drawing Sheet

DAMPING DEVICE FOR DAMPING NOTABLY THE VIBRATIONS RELATIVE TO A STRUCTURAL ELEMENT

This is a continuation of co-pending application Ser. No. 779,548 filed on Sept. 24, 1985, now abandoned.

BACKGROUND OF THE INVENTION

The present invention is directed to a device for damping vibrations, particularly these vibrations associated with structural elements.

Attempts have been made to damp structural vibrations with viscoelastic materials which are known to have a high capacity to dissapate energy, i.e. damp vibrations.

A major drawback to the use of viscoelastic damping materials alone, is their low modulus with respect to structural materials which exhibit quasielastic or quasiresilient behavior.

To overcome this problem, stress supporting or constraining plates have been added to the viscoelastic material on the side opposite the structural element being damped. These plates are usually made of rigid sheet metal, though more recently some thinner, slightly more flexible sheet metals and thermoplastics have been used.

Such a prior art device is described in U.S. Pat. No. 3,399,104 where the daming efficiency of the viscoelastic material is said to be significantly enhanced by the addition of a stiff, rigid constraining plate. The plate may be made of various materials such as aluminum and other sheet metals, wood laminate, metal foils or thermoset plastic sheets.

These devices exhibit several undesirable characteristics, especially when used on a bendable or flexible structural element. Included are the lack of any orthotropic properties in the constraining layer, the unsatisfactory directionality of damping, the unsatisfactory selectivity of damping, the inability to set rigidity and the lack of mechanical linkage between the viscoelastic material and the upper supporting layer. Further, as the supporting layer is made of sheet metal, the prior art devices are heavy. They are also difficult to properly manufacture and are expensive.

SUMMARY AND OBJECTS OF THE INVENTION

The present invention relates to a damping device having a lower viscoelastic damping layer affixed to the structural element to be damped, and an upper stress constraining layer affixed to viscoelastic layer on the side opposite of the structural element. The stress constraining layer exhibits the following characteristics:
  Orthotropic properties
  Directionality of damping
  Selectivity of damping
  Settable rigidity
  Mechanical linkage with the viscoelastic layer
  Confinement of the viscoelastic layer The present invention overcomes the problems of the prior art and provides a novel damping device.

It is an object of the present invention to provide a damping device having a lower viscoelastic layer attached to a structural element to be damped and an upper stress constraining layer wherein the upper stress constraining layer is a composite of a stress constraining element embedded in a damping material which provides the upper stress constraining layer with good rigidity and orthotropic properties, selectivity and directionality of damping, mechanical linkage and confinement of the lower viscoelastic layer.

It is a further object of the present invention to provide a damping device having an upper stress constraining layer which contains a stress constraining element made of one or more elongate elements linked or connected together at least at discrete or definite points.

Another object is to provide a cloth-like constraining element.

An object of the present invention is to provide a damping device that is lightweight, inexpensive and easy to manufacture.

A further object is to provide a damping device having orthotropic properties, directionality of damping, selectivity of damping, settable rigidity, good mechanical linkage between the viscoelastic layer and the stress constraining layer and the ability to confine the viscoelastic layer.

Another object of the present invention is to form a damping device having a stress constraining layer made of several sub-layers of different damping materials, each having a different modulus from the other.

An object of the present invention is to provide a damping device with a composite stress constraining layer having elongate stress constraining elements, each element being made from a different material and exhibiting a different rigidity modulus.

A further object is to provide a damping device with better mechanical linkage between the viscoelastic layer and the constraining layer by using the same viscoelastic material in the upper stress constraining layer and in the lower viscoelastic layer.

Another object is to provide a lightweight, constraining layer with properties similar to that of metal stress supporting plates, but without the disadvantages of such metal plates.

Other objects and advantages of the present invention will be apparent from the specification, drawings and claims.

DETAILED DESCRIPTION

Figure 2:
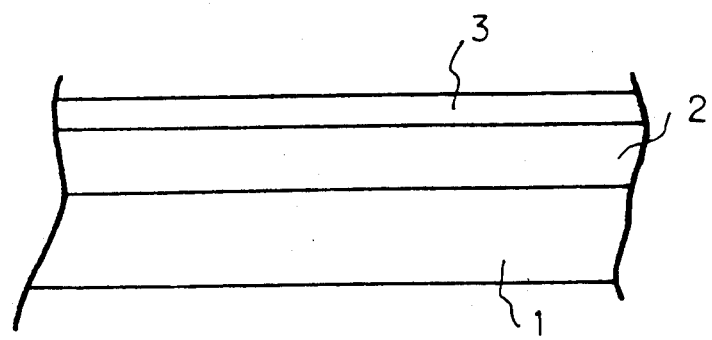
FIG. 2 is a side, cross-sectional view of a prior art damping device.

Referring to the drawings, in FIG. 2 is shown a prior art daming device which comprises a structural element 1 to be damped, a lower viscoelastic damping layer 2, attached to structural element 1 and an upper stress constraining layer 3 attached to the viscoelastic layer 2 on the side opposite to the structural element 1. The constraining layer 3 is formed of sheet metal or metal plate.

As previously mentioned, this damping device is relatively heavy, due to the use of the rigid, metal constraining layer. Further, this device exhibits unsatisfactory orthotropic properties, directionality and selectivity of damping, settability of rigidity and mechanical linkage between the viscoelastic layer 2 and constraining layer 3.

Also, the manufacture of such a prior art device requires the use of special tools and the ability to change size is difficult requiring reworking of the materials and often retooling as well.

Figure 1:
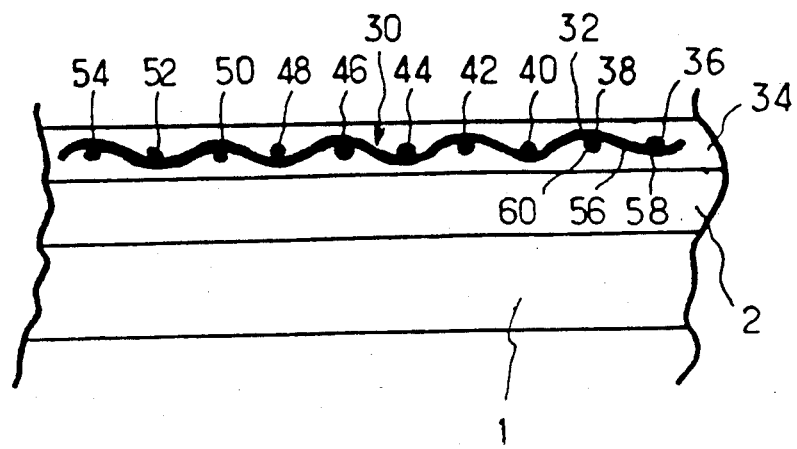
FIG. 1 is a side view of the present damping device taken in cross-section in accordance with a preferred embodiment of this invention.

A preferred embodiment of the present invention is shown in FIG. 1. The damping device has a viscoelastic layer 2. The lower portion of which is attached to the structural element 1, to be damped. An upper stress constraining layer 30 is attached to the viscoelastic layer 2 on the side opposite of the structural element 1. The upper constraining layer 30 is a composite comprised of a stress constraining element 32 embedded in a damping material 34.

The constraining element 32 is formed by linking or connecting one or more elongate elements, such as 56, 58 and 60, together at least at definite or discrete points, such as at 36 to 54. The elongate element or elements, 56, 58 and 60 are preferably formed of strands, fibers or wisps of fibers of a mechanically resistant material, which preferably has a high rigidity modulus.

The stress constraining element 32 unlike the metal constraining layers of the prior art, has excellent damping characteristics including but not limited to good orthotropic properties, selectivity and directionality of damping and settable ridigity.

A preferred embodiment of the constraining element 32 is a cloth-like element made from the one or more elongate elements, such as 56, 58 and 60.

Such a cloth-like constraining element is preferably a knitted fabric, such that the element 56 is, for example, a longitudinal element knitted with transverse elements, 58 and 60. The cloth-like constraining element may also be woven, unwoven or formed in any other manner known in the textile art for creating a cloth-like element.

In one embodiment of the present invention, the cloth-like element is formed from a single elongate element such as may commonly occur in knitting. In such an embodiment, the elongate elements 56, 58 and 60 of FIG. 1 are all the same elongate element, but knit or otherwise formed into a cloth-like element.

In another embodiment of the present invention, the elongate elements 56, 58 and 60, are separate elements forming the cloth-like element. When the elongate elements 56, 58 and 60 are separate and distinct, it preferred that each elongate element 56, 58 and 60 be made of a different material having a modulus different from that of the others. This allows one to form a cloth-like element having the exact degree of rigidity required for the specific damping task. Further, one could vary the order of the different elongate elements to form a cloth-like element with different degrees of rigidity across or down its length. That would allow one to create a constraining layer with greater or lesser damping ability at the edges or the middle or elsewhere, depending upon the requirements of the structural element being damped.

If the cloth-like element is in an unwoven form, it is preferred that the cloth-like element be formed of a grid of bundles of elongate elements linked together at points where they touch by adhesives, welds or any other means conventionally used to form an unwoven cloth-like element.

Preferably, the elongate elements are made of a mechanically resistant material having a modulus from about 6000 to about 660,000 MPa. Examples of such materials include, but are not limited to non-metallic or metallic materials or mixtures thereof, such as glass fiber, nylon, and other organic fibers, as well as metal fibers or strands, or wire, either braided or unbraided.

The size of the elongate elements may vary greatly depending primarily upon the requirements of rigidity, thickness, weight and degree of damping as well as the size of the damping device.

if the elongate elements are formed into a cloth-like element, they may be calendered or stretched, as is commonly taught in the textile art.

The constraining element 32 is embedded in a damping material 34. The damping material 34 may be any material which exhibits damping properties between minus 50° C. and plus 250° C. and which preferably has a modulus of from about 0.1 to about 5000 MPa.

The damping material 34 may be cured or uncured elastomeric materials, heat curable polymers and copolymers, thermoplastic polymers and copolymers or mixtures thereof. Examples of such materials useful in the present invention include, but are not limited to, natural rubber, curred or uncured; nitrile polymers; polychloroprene polymers; butylpolymers; silicone polymers; polybutadiene polymers; polyethylene polymers; polyvinyl chloride polymers; epoxy resins, phenolic resins, polyimides; polyesters and copolymers, derivatives or mixtures of the above.

It is preferred that if heat curable resins or polymers are used that they be usable as a damping material up to temperatures of 500° C.

Of course any mixture can be made with the above materials, including mixtures of heat curable resins with any of the cured or uncured materials and/or thermoplastics.

In one embodiment of the present invention the damping materials 34 can be made of the same viscoelastic material as in the viscoelastic layer 2 and may be connected or attached to the viscoelastic layer 2 by any means known in the art. Preferably, the damping material 34 in the upper layer 30 and viscoelastic layer 2 are formed at the same time or sequentially and finished together into the final damping device. It has been determined that there is improved adherization, i.e. mechanical linkage, of the upper layer 30 to the viscoelastic layer 2 by using the same viscoelastic material and forming the layers simultaneously or sequentially.

Alternatively the damping material 34 of the upper layer 30 can be formed of several sublayers of different damping materials, each having a different modulus, to provide varying degrees of damping. The constraining element 32 may be embedded in one or more of the sublayers, depending upon the relative thickness of the element 32 and the sublayers.

Further, more than one upper layer 30 may be used in the present invention if necessary to obtain a desired degree of damping. The additional upper layers may be attached or connected by any conventional means such as adhesives or by using the same damping material as in the first upper layer and finishing them at the same time.

The damping device may be formed in situ upon the structural element to be damped or it may be made separately and then attached to the structure by mechanical means such as screws or rivets or by chemical means, such as adhesives. The means by which the damping device is attached to the structural element is not critical, so long as the means does not interfer with the damping properties of the device and securely holds the damping device to the structural element.

The damping device provides excellent damping properties and is lightweight and inexpensive. The damping device appears to provide the damping effect by modifying the inertia terms of the structure and by adding a significant out of phase term which further enhances the damping effect of the damping device.

The damping device may be used for damping vibration in any structural element, but most preferably, in those elements which exhibit quasielastic or resilient properties. Examples of structures on which the damping device may be used includes but is not limited to building components such as beams or supports; wall, floor or ceiling panels; body panels and other components in automobiles, airplanes or ships; circuit boards; sporting equipment such as skis; or machinery, such as in high speed offset inking rollers.

Although this invention has been described with reference to its preferred embodiments, other embodiments can achieve the same results.

Variations and modifications to the present invention will be obvious to those skilled in the art and it is intended to cover in the appended claims all such modifications, variations and equivalents that follow in the spirit and scope of this invention.

I claim:

1. A daming device for damping notably the vibrations relative to a structural element consisting essentially of a lower damping viscoelastic layer made from a damping viscoelastic material, affixed to a surface of a structural element to be damped, and an upper stress constraining layer located above the viscoelastic layer opposite to the structural element wherein the upper layer is a composite stress constraining layer having a stress constraining element embedded in a damping material.

2. The damping device of claim 1, wherein the stress constraining element is formed of one or more elongate elements of a mechanically resistant material, the elongate elements being linked or connected together at least at definite or discrete points.

3. The damping device of claim 2 wherein the elongate element are selected from the group consisting of strands, fibers ans wisps of fibers.

4. The damping device of claim 2, wherein the stress constraining element is formed of one continuous elongate element.

5. The damping device of claim 1, wherein the stres constraining element is a cloth-like element made from one or more elongate elements selected from the group consisting of strands, fibers and wisps of fibers and being made of a mechanically resistant material.

6. The damping device of claim 5 wherein the cloth-like element is knitted.

7. The damping device of claim 5 wherein the cloth-like element is woven.

8. The damping device of claim 5 wherein the cloth-like element is unwoven.

9. The damping device of claim 8, wherein the unwoven cloth-like element is made from a grid of bundles of strands linked together by welds, adhesives, or heat bonds.

10. The damping device of claim 2 wherein the modulus of the one or more elongate elements ranges from about 6000 MPa to 660,000 MPa.

11. The damping device of claim 1 wherein the damping material of the upper stress constraining layer has damping properties over a temperature range from about $-50°$ C. to $+250°$ C. and has a modulus from about 0.1 to about 5000 MPa.

12. The damping device of claim 1 wherein the damping material is selected from the group consisting of elastomeric materials, heat curable polymers, themoplastic polymers and mixtures thereof.

13. The damping device of claim 1 wherein the damping material consists of several sub-layers, each sub-layer being of a different damping material having different damping properties or abilities.

14. The damping device of claim 1 wherein the stress constraining element is made of one or more non-metallic elongate elements.

15. The damping device of claim 1 wherein the stress supporting element is made of one or more metallic elongate elements.

16. The damping device of claim 2, wherein the stress supporting element may be calendered and/or stretched.

17. The damping device of claim 1 wherein the viscoelastic layer and the damping material of the stress supporting layer are made of the same material.

18. The damping device of claim 2 wherein the stress contraining element is formed of a number of elongate elements, each exhibiting a different modulus of rigidity.

19. A damping device consisting essentially of a lower viscoelastic layer and an upper constraining layer having a stress constraining cloth-like element embedded in a damping material, the damping material is selected from the group consisting of elastomeric materials, heat curable polymers and copolymers, thermoplastic polymers and copolymers and mixtures thereof.

20. A damping device consisting essentially of a lower viscoelastic layer and an upper viscoelastic layer formed of a same material as the lower layer and wherein the upper viscoelastic layer has a cloth-like stress constraining element embedded within the layer.

* * * * *